United States Patent
Pastusak et al.

(10) Patent No.: US 7,259,535 B1
(45) Date of Patent: Aug. 21, 2007

(54) APPARATUS AND METHOD FOR SITUATING A TOOL WITH RESPECT TO A WORK SITE ON A WORKPIECE

(75) Inventors: Thomas W. Pastusak, Kent, WA (US); Gregory L. Clark, Issaquah, WA (US)

(73) Assignee: Boeing Company, Chicago, IL (US)

( * ) Notice: Subject to any disclaimer, the term of this patent is extended or adjusted under 35 U.S.C. 154(b) by 0 days.

(21) Appl. No.: 11/430,453

(22) Filed: May 8, 2006

(51) Int. Cl.
*B25J 15/02* (2006.01)

(52) U.S. Cl. .................. 318/568.21; 318/568.12; 318/568.16; 074/490.01; 074/490.03

(58) Field of Classification Search ............... 318/567, 318/568.12, 568.16, 568.21; 074/490.01, 074/490.03
See application file for complete search history.

(56) References Cited

U.S. PATENT DOCUMENTS

| | | | |
|---|---|---|---|
| 3,241,687 A | 3/1966 | Orloff | 214/1 |
| 4,505,166 A | 3/1985 | Tesar | 74/479 |
| 5,129,044 A | 7/1992 | Kashiwagi et al. | 395/86 |
| 5,429,015 A | 7/1995 | Somes | 74/665 |
| 5,553,509 A | 9/1996 | Somes | 74/89.2 |
| 5,784,282 A | 7/1998 | Abitbol et al. | 364/474.28 |
| 5,845,540 A * | 12/1998 | Rosheim | 74/490.05 |
| 5,893,296 A * | 4/1999 | Rosheim | 74/490.03 |
| 6,105,455 A * | 8/2000 | Rosheim | 74/490.06 |
| 6,347,259 B1 | 2/2002 | Goldenberg et al. | 700/218 |
| 6,424,077 B1 | 7/2002 | Hata et al. | 310/328 |
| 6,681,145 B1 | 1/2004 | Greenwood et al. | 700/193 |
| 6,701,196 B2 | 3/2004 | Itoko et al. | 700/57 |
| 6,898,484 B2 | 5/2005 | Lemelson et al. | 700/245 |
| 2004/0260422 A1 | 12/2004 | Greenwood et al. | 700/193 |

OTHER PUBLICATIONS

Mavroidis, C. et al.; "End-Point Control of Long Reach Manipulator Systems"; Ninth World Congress on the Theory of Machines and Mechanisms, Sep. 1-3, 1995; Milan, Italy.

Brown, Benjamin H. et al.; "A Precision Manipuator Module for Assembly in a Minifactory Environment"; International Conference on Intelligent Robots and Systems, Maui, Hawaii; Oct. 29-Nov. 3, 2001.

DeVlieg, Russell, et al.; "ONCE (ONe-sided Cell End effector) Robotic Drilling System:"; Society of Automitive Engineers, Inc., 2002.

Kennedy, Chris; "Design of 2 DOF Robot for 'Micro' Manipulation"; Program for Robotics, Intelligent Sensing and Mechatronics, Drexel University; Feb. 16, 2006.

* cited by examiner

*Primary Examiner*—Rina Duda
(74) *Attorney, Agent, or Firm*—Law Office of Donald D. Mondul

(57) ABSTRACT

An apparatus coupled with a mechanism and cooperating with the mechanism to locate an end-effector within a predetermined distance of a work site for situating the end-effector with respect to the work site includes: (a) a positioning unit coupled with the end-effector for moving the end-effector an adjustment distance with respect to the workpiece; (b) a sensing unit coupled with the apparatus for sensing extant locus of the end-effector with respect to at least one reference locus; and (c) an error determining device coupled with the sensing unit and the positioning unit; the error determining device determining a difference between the extant locus and the work locus. The positioning unit moves the end-effector in response to the difference indicating signal to reduce the difference.

20 Claims, 3 Drawing Sheets

APPARATUS AND METHOD FOR SITUATING A TOOL WITH RESPECT TO A WORK SITE ON A WORKPIECE

BACKGROUND OF THE INVENTION

The present invention is directed to equipment employed in the precision manufacturing of products. By way of example and not by way of limitation, the large sizes of aircraft assemblies and the high degree of accuracy required in their manufacture present demanding requirements for equipment used in the manufacturing process. Generally, tooling and equipment used in the precision manufacturing of products, such as producing large assemblies like aircraft assemblies, are costly, have long lead times for their delivery and are often of specialized design so that they are inflexible in their application to a production of a variety of products.

Some portable manual and semi-manual machine tools have been developed to perform accurate drilling operations. One example of an aircraft manufacturing machine tool system is the Static Optical Machine Control (SOMaC) system developed by The Boeing Company and described in U.S. Patent Application Publication 2004/0260422 A1 of Dec. 23, 2004, for "Software for Improving the Accuracy of Machines". Prior art manufacturing systems have been designed for use with a positioning device such as a numerical control (NC) machine tool or a robotic tool and depend upon such underlying positioning devices for location with respect to a work site on a workpiece. Such underlying positioning devices have proven to be less accurate than is desired for precision manufacturing and similar operations in such high precision environments as, by way of example and not by way of limitation, aircraft assembly operations. The underlying positioning devices such as robotic mechanisms have exhibited excessive flexibility so that the requisite stiffness required for precise end-effector location for operations such as drilling or similar operations cannot be achieved reliably or repeatably.

One attempt to solve this problem included the use of a laser with a manually placed positioning device for locating a drilling tool at a worksite with the requisite accuracy. However, the manual placement of the positioning device is slower than is desired for a high speed, yet accurate operation.

There is a need for an apparatus and method for situating an end-effector with respect to a work site on a workpiece that permits high speed, accurate manufacturing operations.

For purposes of this disclosure, the term "end-effector" is intended to refer to an item that effects work with respect to a workpiece. By way of example and not by way of limitation, an end-effector may include a drill, a punch or a similar material-working item. Also for purposes of this disclosure, the term "tooling" is intended to refer to a fixturing device that holds a workpiece.

SUMMARY OF THE INVENTION

An apparatus coupled with a mechanism and cooperating with the mechanism to locate an end-effector within a predetermined distance of a work site for situating the end-effector with respect to the work site includes: (a) a positioning unit coupled with the end-effector for moving the end-effector an adjustment distance with respect to the workpiece; (b) a sensing unit coupled with the apparatus for sensing extant locus of the end-effector with respect to at least one reference locus; and (c) an error determining device coupled with the sensing unit and the positioning unit; the error determining device determining a difference between the extant locus and the work site. The positioning unit moves the end-effector in response to the difference indicating signal to reduce the difference.

A method for use with a positioning device that locates an end-effector to within a predetermined distance of a work site on a workpiece for situating the end-effector with respect to the work site includes the steps of: (a) In no particular order: (1) providing a motive unit coupled with the end-effector; (2) providing at least one sensing unit coupled with at least one of the end-effector and the motive unit; (3) providing an error determining device coupled with the at least one sensing unit and coupled with the motive unit; and (4) providing a control unit coupled with the error determining device and with the motive unit. (b) Operating the sensing unit to sense extant locus of the end-effector with respect to at least one reference locus. (c) Operating the error determining device to present a difference indicating signal representing a difference between the extant locus and the work locus. (d) Operating the control unit to receive the difference indicating signal and to present a control signal related to the difference indicating signal. (e) Operating the motive unit to move the end-effector in response to the control signal to reduce the difference.

It is, therefore, a feature of the present invention to provide an apparatus and method for situating an end-effector with respect to a work site on a workpiece that permits highly accurate manufacturing operations utilizing inaccurate and lower cost robotic machine tools, as compared to using higher cost NC (Numerical Control) machine tools.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

One technique for reducing tooling costs is the use of determinant assembly techniques using features of the workpiece being treated as positioning references such as, by way of example and not by way of limitation, holes, joints, edges or other features of the workpiece. The present invention includes a micro positioning end-effector-holding apparatus that is carried by a low-cost robotic or other pre-positioning unit to position an end-effector in the vicinity of a work site on the workpiece. The pre-positioning unit (e.g., a robot) is typically more flexible than is feasible to achieve the desired accuracy of positioning of the end-effector with respect to the work site. The apparatus of the present invention permits precisely accurate positioning of the end-effector with respect to the work site after pre-positioning the end-effector in the vicinity of the work site and substantially fixing the position of the end-effector-holding apparatus holding the end-effector with respect to the workpiece.

Figure 1:
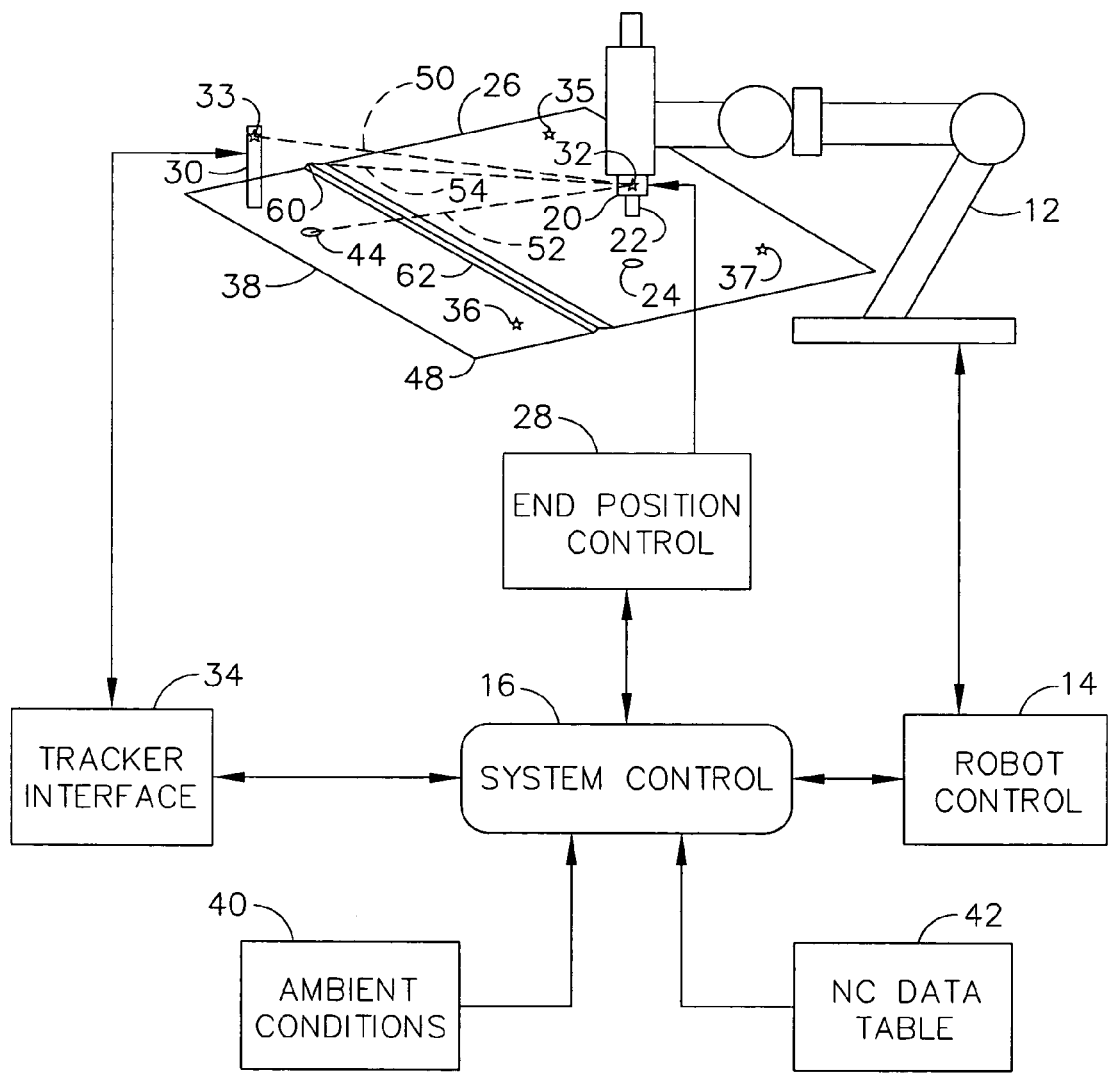
FIG. 1 is a schematic diagram illustrating employment of the present invention with a robot machine tool unit.

FIG. 1 is a schematic diagram illustrating employment of the present invention with a robot machine tool unit. In FIG. 1, a manufacturing system 10 includes a pre-positioning unit 12. By way of example and not by way of limitation, pre-positioning unit 12 may be embodied in a robot device controlled by a robot control unit 14. A system control unit 16, controls manufacturing system 10 and is operationally coupled with robot control unit 14. Pre-positioning unit 12 supports an end-effector-holding apparatus 20. End-effector-holding apparatus 20 supports an end-effector 22 near a work site 24 on a workpiece 26.

End-effector-holding apparatus 20 is coupled with an end position control unit 28. End position control unit 28 is coupled with system control unit 16. An error determining device is representatively embodied in FIG. 1, by way of example and not by way of limitation, in a laser tracker reference structure 30 affixed with workpiece 26 for communication with a target 32 affixed with end-effector-holding apparatus 20. Tracker reference structure 30 is coupled with a tracker interface unit 34. Tracker interface unit 34 is coupled with system control unit 16.

Manufacturing system 10 may also include input units 40, 42 for providing information to system control unit 16. Input unit 40 may provide, by way of example and not by way of limitation, information relating to ambient conditions such as temperature, humidity and other ambient conditions. Ambient conditions may affect operational aspects of tooling system 10, such as time of flight of lasers, expansion of workpiece and other operational aspects of tooling system 10. Input unit 42 may provide, by way of example and not by way of limitation, control information such as numerical control (NC) data or similar information for effecting control of tooling system 10 to achieve a desired product.

Controlling the position of end-effector-holding apparatus 20 substantially effects control of the position of end effector 22. Knowing the position of target 32, which may by example be determined by position indicators identified with respect to three distinctly different locations, substantially equates to knowing the position of end-effector-holding apparatus 20. By way of example and not by way of limitation, the position of target 32 may be learned by laser locating target 32 with respect to tracker reference structure 30 and by commanding end-effector-holding apparatus 20 to move to at least three distinct locations while pre-positioning unit 12 remains stationary. In the exemplary embodiment of FIG. 1 tracker reference structure 30 is embodied in a post-like structure supporting a laser pointing device 33 in substantially fixed relation with respect to workpiece 26. Laser-locating of target 32 with respect to laser pointing device 33 is represented in FIG. 1 by a dotted laser path indicator 50. Location of end-effector-holding apparatus 20 and work site 24 may be determined using laser-locating technology (for example) with respect to known features of workpiece 26. By way of example and not by way of limitation, location of end-effector-holding apparatus 20 and work site 24 may be known with respect to laser targets that are situated at loci 35, 36, 37. Alternatively, by way of further example and not by way of limitation, location of end-effector-holding apparatus 20 and work site 24 may be known with respect to other features of workpiece 26 such as an edge 38, a corner 48, or an aperture 44. By way of still further example and not by way of limitation, other locating technologies may be employed for locating target with respect to end-effector-holding apparatus 20 and work site 24 such as sonar locating technology, other light-based locating technology than laser technology, surface acoustic wave technology, other sonic-based locating technology, inductive technology, resistive technology, capacitive locating technology, microwave locating technology, millimeter wave locating technology, other electromagnetic locating technology or another locating technology employing measurement of one or more parameters that may be detected and measured to provide location information relating to end-effector-holding apparatus 20 and work site 24. Features of work piece 26 such as edge 38, corner 48 and aperture 44 or other loci with respect to workpiece 26 may be marked by an indicator for highlighting such features for easy identification and location by a sensing technology. For example, laser targets may be located near such features to assist in using a laser locating technology for operating the present invention. Tracker interface unit 34 conveys information relating to location of target 32 with respect to workpiece 26 and, hence, with respect to work site 24, to system control unit 16. System control unit 16 determines a difference between the extant location of target 32 with respect to work site 24 and a desired location of target 32 with respect to work site 24 for proper orientation. A control signal is provided by system control unit 16 to end position control unit 28 for moving end-effector-holding apparatus 20 in a direction to reduce the difference between the extant location of target 32 and the desired position of target 32.

By way of further example and not by way of limitation, the position of target 32 may be learned by laser locating target 32 with respect to other features of workpiece 26, such as an end 60 of a ridge 62 in workpiece 26. In the exemplary embodiment of FIG. 1, laser locating target 32 with respect to end 60 of ridge 62 is represented in FIG. 1 by a dotted laser path indicator 54. Whatever technology is employed for determining location of work piece 26, location information relating to position of end-effector-holding apparatus 20 with respect to work site 24 is be provided to system control unit 16. System control unit 16 employs the received location information for providing an error control signal to end position control unit 28. The error control signal is related to the difference between the extant location of end-effector-holding apparatus 20 and location of work site 24. End position control unit 28 uses the error information received from system control unit 16 to move end-effector-holding apparatus 20 to reduce the difference between the extant location of end-effector-holding apparatus 20 and location of work site 24.

Figure 2:
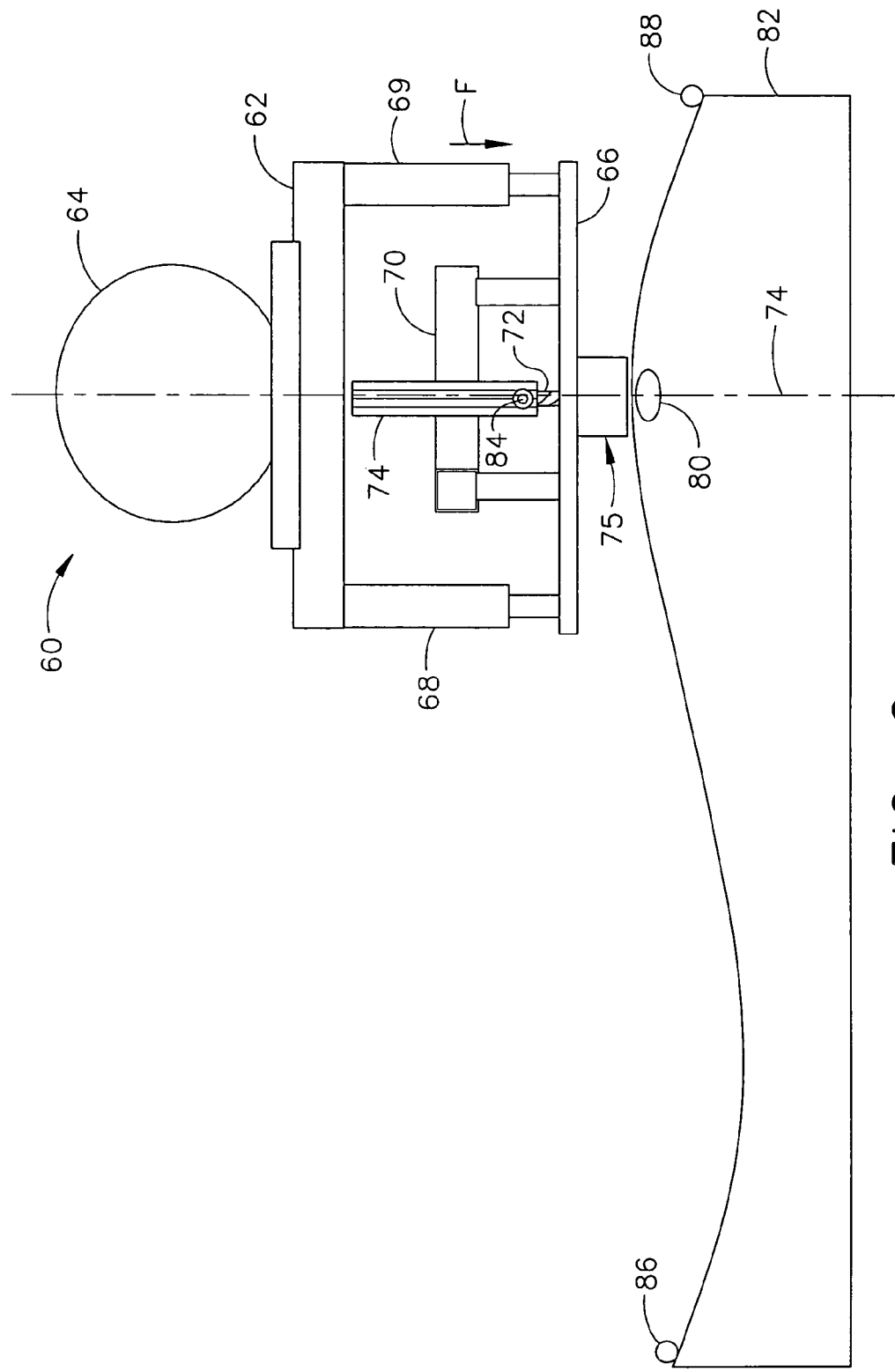
FIG. 2 is a schematic diagram of the apparatus of the present invention.

FIG. 2 is a schematic diagram of the apparatus of the present invention. In FIG. 2, an end-effector-holding apparatus 60 includes a base member 62 coupled with a robot arm 64. Base member 62 is preferably movably coupled with a position-fixing unit 66 via plunger units 68, 69 allowing movement substantially parallel with an axis 74. A positioning unit 70 is preferably movably coupled with position-fixing unit 66. Positioning unit 70 is movable substantially parallel with an X-Y plane which is substantially perpendicular to axis 74. Moving of positioning unit 70 may be effected by any manner of motive unit known in the art including, by way of illustration and not by way of limitation, a pneumatic unit; a hydraulic unit; a direct drive unit using spur gears, worm gears, pistons, pulleys or blocks, or combinations of such mechanisms or other mechanisms or motive units. Positioning unit 70 supports a tool 72 in a tool support, such as a drill and feed device 74. In the exemplary embodiment of the end-effector unit of the present invention illustrated in FIG. 2, tool 72 may be a drill bit supported in a drill and feed device support 74 embodied in a drill bit spindle. Other tools 72 may be supported by other tool supports 74 within the scope of the present invention.

In operation, robot arm 64 is employed to initially position end-effector-holding apparatus 60 near a work site 80 on a workpiece 82. Plunger units 68, 69 exert a force F to urge position-fixing unit 66 into contact with workpiece 82, thereby fixing relative positions of workpiece 82 and end-effector-holding apparatus 60. In the exemplary embodiment of end-effector-holding apparatus 60 illustrated in FIG. 2, a part contact bushing member 75 is situated between position-fixing unit 66 and workpiece 82 so that part contact bushing member 75 applies substantially all force exerted upon workpiece 82 by end-effector-holding apparatus 60. In the preferred embodiment, the clamp-up force will be set to be greater than the expected drill force. After the relative positions of workpiece 82 and end-effector-holding apparatus 60 are fixed, positioning unit 70 may be moved in the X-Y plane to locate tool 72 substantially in register with work site 80.

End-effector-holding apparatus 60 is preferably employed in a system, such as end-effector-holding apparatus 20 is employed in manufacturing system 10 (FIG. 1). In such a system application, a target 84 is situated near tool 72 to indicate as nearly as possible the position of tool 72 in a plane substantially parallel with the X-Y plane. Actually affixing target 84 to tool 72 may be impractical when tool 72 moves in a manner that masks target 84 during at least a portion of the tooling operation performed by tool 72. This case would occur, by way of example and not by way of limitation, when tool 72 is embodied in drill bit. The drill bit may rotate to mask target 84 on a side facing away from an observation station. In the preferred embodiment of the present invention, robot arm 64 has a degree of rotation enabling rotation of end-effector-holding apparatus 60 back toward the laser system (or other observation station) to maintain target visibility by the laser system (or other locating system).

It is preferred that the force on workpiece 82 and force on robot arm 64 remain substantially unchanged throughout any tooling or related operation performed at work site 80. Such a desired result will require that tool pressure (e.g., drill thrust) will preferably increase as urging force, or clamping force, of end-effector unit 60 against workpiece 82 decreases, and tool pressure will preferably decrease if clamping force increases. Such substantially constant forces on workpiece 82 and on robot arm 64 result in a substantially unchanged force applied to robot arm 64 during the tooling operation. Clamping end-effector unit 60 with workpiece 82 through contact with bushing 75 further serves to provide a reference with respect to workpiece 82 for effecting accurate depth control for tooling operations, when required. Clamping end-effector unit 60 with workpiece 82 also serves to better assure that true tooling occurs such as by way of example and not by way of limitation round holes rather than oval holes. Round holes are not a likely result of drilling if robot arm 64 deflects during a drilling operation.

Reference loci 86, 88 are provided on workpiece 82 for use as reference loci in precisely locating target 84 (and, hence, tool 72) with respect to work site 80. Reference loci 86, 88 are preferably embodied in at least one feature of workpiece 82 such as, by way of example and not by way of limitation, holes, joints, edges or other features of the workpiece (see FIG. 1).

Figure 3:
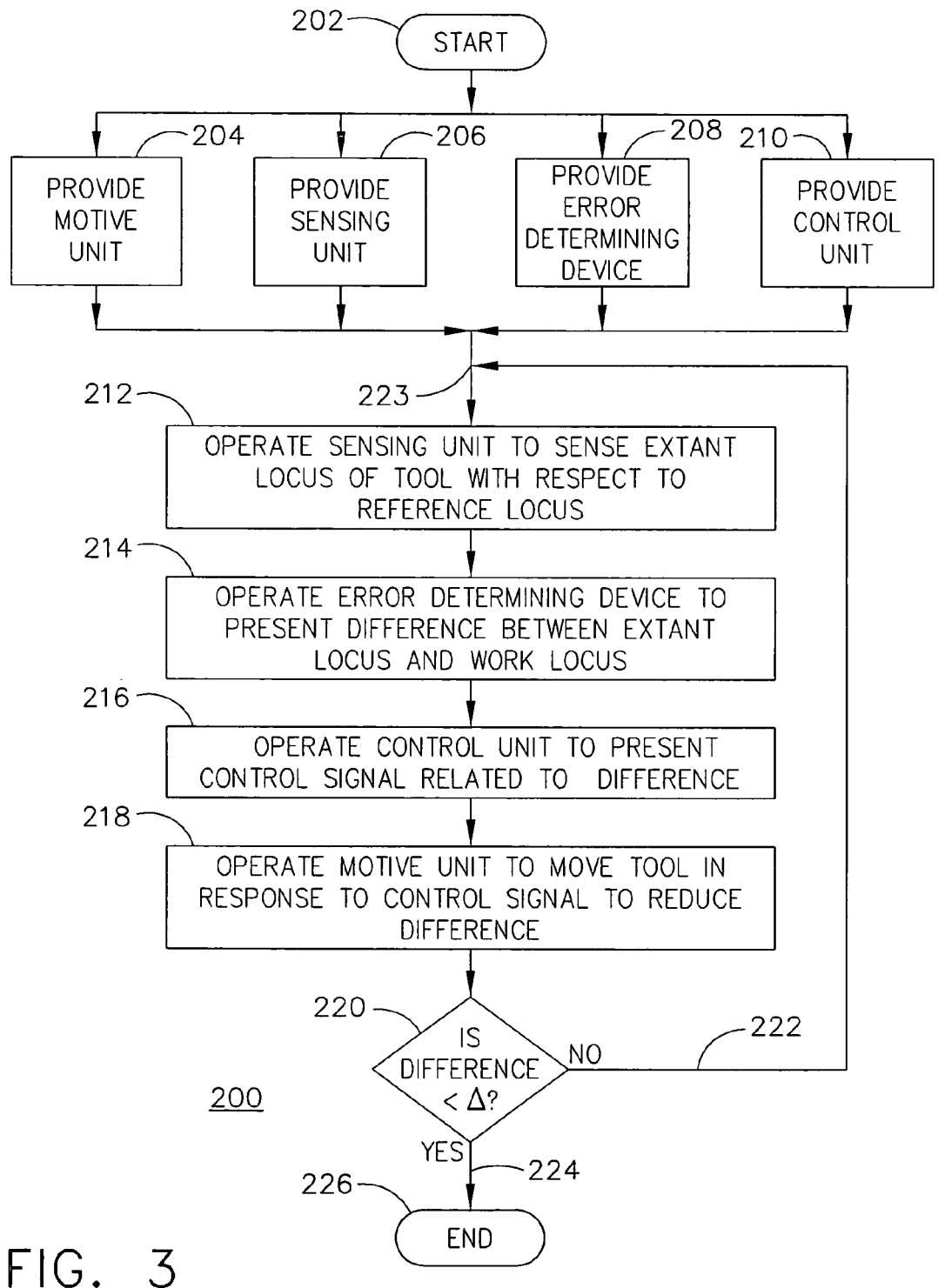
FIG. 3 is a flow chart illustrating the method of the present invention.

FIG. 3 is a flow chart illustrating the method of the present invention. In FIG. 3, a method 200 or use with a positioning device for situating a tool with respect to a work site on a workpiece begins at a START locus 202. The positioning device locates the tool within a predetermined distance of the work site. Method 200 continues with the step of, in no particular order: (1) providing a motive unit coupled with the tool, as indicated by a block 204; (2) providing a sensing unit coupled with the motive unit, as indicated by a block 206; (3) providing an error determining device coupled with the sensing unit and coupled with the motive unit, as indicated by a block 208; and (4) providing a control unit coupled with the error determining device and with the motive unit, as indicated by a block 210.

Method 200 continues by operating the sensing unit to sense extant locus of the tool with respect to at least one reference locus, as indicated by a block 212. Method 200 then continues with the step of operating the error determining device to present a difference indicating signal representing a difference between the extant locus and the work locus, as indicated by a block 214.

Method 200 continues with operating the control unit to receive the difference indicating signal and to present a control signal related to the difference indicating signal, as indicated by a block 216.

Method 200 continues by operating the motive unit to move the tool in response to the control signal to reduce the difference, as indicated by a block 218.

Method 200 then poses a query whether the difference between the extant locus and the work locus is less than a predetermined amount (e.g., predetermined amount Δ), as indicated by a block 220. If the difference between the extant locus and the work locus is not less than a predetermined amount, method 200 proceeds according to NO response line 222 to return to a locus 223. Method 200 then proceeds from locus 223 performing steps represented by blocks 212, 214, 216, 128, 220. If the difference between the extant locus and the work locus is less than a predetermined amount, method 200 proceeds according to YES response line 224 and method 200 terminates at an END locus 226.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for situating an end-effector with respect to a work site on a workpiece; the apparatus being coupled with a mechanism and cooperating with said mechanism to locate said end-effector within a predetermined distance of said work site; the apparatus comprising:

(a) a positioning unit coupled with said end-effector for moving said end-effector an adjustment distance with respect to said workpiece;

(b) a sensing unit coupled with the apparatus for sensing extant locus of said end-effector with respect to at least one reference locus; and (c) an error determining device coupled with said sensing unit and said positioning unit; said error determining device determining a difference between said extant locus and said work locus;

said positioning unit moving said end-effector in response to said difference indicating signal to reduce said difference.

2. An apparatus for situating an end-effector with respect to a work site on a workpiece as recited in claim 1 wherein said at least one reference locus is at least one feature of said workpiece.

3. An apparatus for situating an end-effector with respect to a work site on a workpiece as recited in claim 1 wherein the apparatus is in contact with said workpiece when said sensing is effected.

4. An apparatus for situating an end-effector with respect to a work site on a workpiece as recited in claim 3 wherein said apparatus remains in contact with said workpiece while said moving is effected.

5. An apparatus for situating an end-effector with respect to a work site on a workpiece as recited in claim 2 wherein the apparatus is in contact with said workpiece when said sensing is effected.

6. An apparatus for situating an end-effector with respect to a work site on a workpiece as recited in claim 5 wherein said apparatus remains in contact with said workpiece while said moving is effected.

7. An apparatus for situating an end-effector with respect to a work site on a workpiece as recited in claim 4 wherein said apparatus remains in contact with a substantially constant pressure to keep said end-effector substantially located at said worksite while said end-effector effects a working operation on said workpiece.

8. An apparatus for situating an end-effector with respect to a work site on a workpiece as recited in claim 6 wherein said apparatus remains in contact with a substantially constant pressure to keep said end-effector substantially located at said worksite while said end-effector effects a working operation on said workpiece.

9. An end-effector-holding apparatus for use with a positioning device for situating an end-effector with respect to a work site on a workpiece; said positioning device locating said end-effector within a predetermined distance of said work site; the apparatus comprising:

(a) a motive unit coupled with said end-effector for moving said end-effector an adjustment distance with respect to said workpiece;

(b) a sensing unit coupled with the apparatus for sensing extant locus of said end-effector with respect to at least one reference locus;

(c) an error determining device coupled with said sensing unit and said positioning unit; said error determining device presenting a difference indicating signal representing a difference between said extant locus and said work locus; and (d) a control unit coupled with said error detecting device and with said motive unit; said control unit receiving said difference indicating signal from said error determining device; said control unit presenting a control signal to said motive unit; said control signal being related to said difference indicating signal;

said motive unit moving said end-effector in response to said control signal to reduce said difference.

10. An end-effector-holding apparatus for use with a positioning device for situating an end-effector with respect to a work site on a workpiece as recited in claim 9 wherein said at least one reference locus is at least one feature of said workpiece.

11. An end-effector-holding apparatus for use with a positioning device for situating an end-effector with respect to a work site on a workpiece as recited in claim 9 wherein the apparatus is in contact with said workpiece when said sensing is effected.

12. An end-effector-holding apparatus for use with a positioning device for situating an end-effector with respect to a work site on a workpiece as recited in claim 11 wherein said apparatus remains in contact with said workpiece while said moving is effected.

13. An end-effector-holding apparatus for use with a positioning device for situating an end-effector with respect to a work site on a workpiece as recited in claim 10 wherein the apparatus is in contact with said workpiece when said sensing is effected.

14. An end-effector-holding apparatus for use with a positioning device for situating an end-effector with respect to a work site on a workpiece as recited in claim 13 wherein said apparatus remains in contact with said workpiece while said moving is effected.

15. An end-effector-holding apparatus for use with a positioning device for situating an end-effector with respect to a work site on a workpiece as recited in claim 12 wherein said apparatus remains in contact with a substantially constant pressure to keep said end-effector substantially located at said worksite while said end-effector effects a working operation on said workpiece.

16. An end-effector-holding apparatus for use with a positioning device for situating an end-effector with respect to a work site on a workpiece as recited in claim 14 wherein said apparatus remains in contact with a substantially constant pressure to keep said end-effector substantially located at said worksite while said end-effector effects a working operation on said workpiece.

17. A method for use with a positioning device for situating an end-effector with respect to a work site on a workpiece; said positioning device locates said end-effector within a predetermined distance of said work site; the method comprising the steps of:

(a) in no particular order:
 (1) providing a motive unit coupled with said end-effector;
 (2) providing a sensing unit coupled with said motive unit;
 (3) providing an error determining device coupled with said sensing unit and coupled with said motive unit; and
 (4) providing a control unit coupled with said error determining device and with said motive unit;

(b) operating said sensing unit to sense extant locus of said end-effector with respect to at least one reference locus;

(c) operating said error determining device to present a difference indicating signal representing a difference between said extant locus and said work locus;

(d) operating said control unit to receive said difference indicating signal and to present a control signal related to said difference indicating signal; and (e) operating said motive unit to move said end-effector in response to said control signal to reduce said difference.

18. A method for use with a positioning device for situating an end-effector with respect to a work site on a workpiece as recited in claim 17 wherein said at least one reference locus is at least one feature of said workpiece.

19. A method for use with a positioning device for situating an end-effector with respect to a work site on a workpiece as recited in claim 17 wherein the apparatus is in contact with said workpiece when said sensing is effected, and wherein said apparatus remains in contact with said workpiece while said moving is effected.

20. A method for use with a positioning device for situating an end-effector with respect to a work site on a workpiece as recited in claim 18 wherein the apparatus is in contact with said workpiece when said sensing is effected, and wherein said apparatus remains in contact with said workpiece while said moving is effected.

* * * * *